United States Patent [19]

Rohr, Jr.

[11] Patent Number: 5,274,736
[45] Date of Patent: Dec. 28, 1993

[54] PRESSURIZED HEATING APPARATUS FOR MAKING COFFEE IN AN AUTOMOBILE

[76] Inventor: Edward J. Rohr, Jr., 570 W. Fulton, Chicago, Ill. 60606

[21] Appl. No.: 599,696

[22] Filed: Oct. 18, 1990

[51] Int. Cl.⁵ .................. A47J 31/00; F24H 1/20
[52] U.S. Cl. .................. 392/447; 222/484; 222/146.5; 99/304; 219/437
[58] Field of Search .......... 392/447, 444; 222/484, 222/483, 608, 146.5; 99/304–; 126/389; 219/437, 202

[56] References Cited

U.S. PATENT DOCUMENTS

| | | | |
|---|---|---|---|
| 3,413,909 | 10/1968 | Heier | 392/444 |
| 3,793,933 | 2/1974 | Weber | 99/283 |
| 3,844,206 | 10/1974 | Weber | 99/300 |
| 4,382,402 | 5/1983 | Alvarez | 99/307 |
| 4,505,191 | 3/1985 | Longo | 99/300 |
| 4,875,408 | 10/1989 | McGee | 99/283 |
| 5,123,335 | 6/1992 | Aselu | 99/295 |

Primary Examiner—Bruce A. Reynolds
Assistant Examiner—John A. Jeffery

[57] ABSTRACT

A transportable pressurized coffee maker adapted to be used in and mounted to an automobile includes a coffee cup to receive brew which can be secured in tandem with the brewing chamber to prevent spills while driving. Safety features include temperature regulation, pressure release, interlocking safety cap, non-pressurized brewing chamber and a cool-to-touch outer shell. This coffee making apparatus also provides a high heat transfer immersion heating element compatible with the nominal 12 volt d.c. electrical system of most automobiles. This coffee making apparatus provides a sealable unit which can be operated while the automobile is in motion.

35 Claims, 4 Drawing Sheets

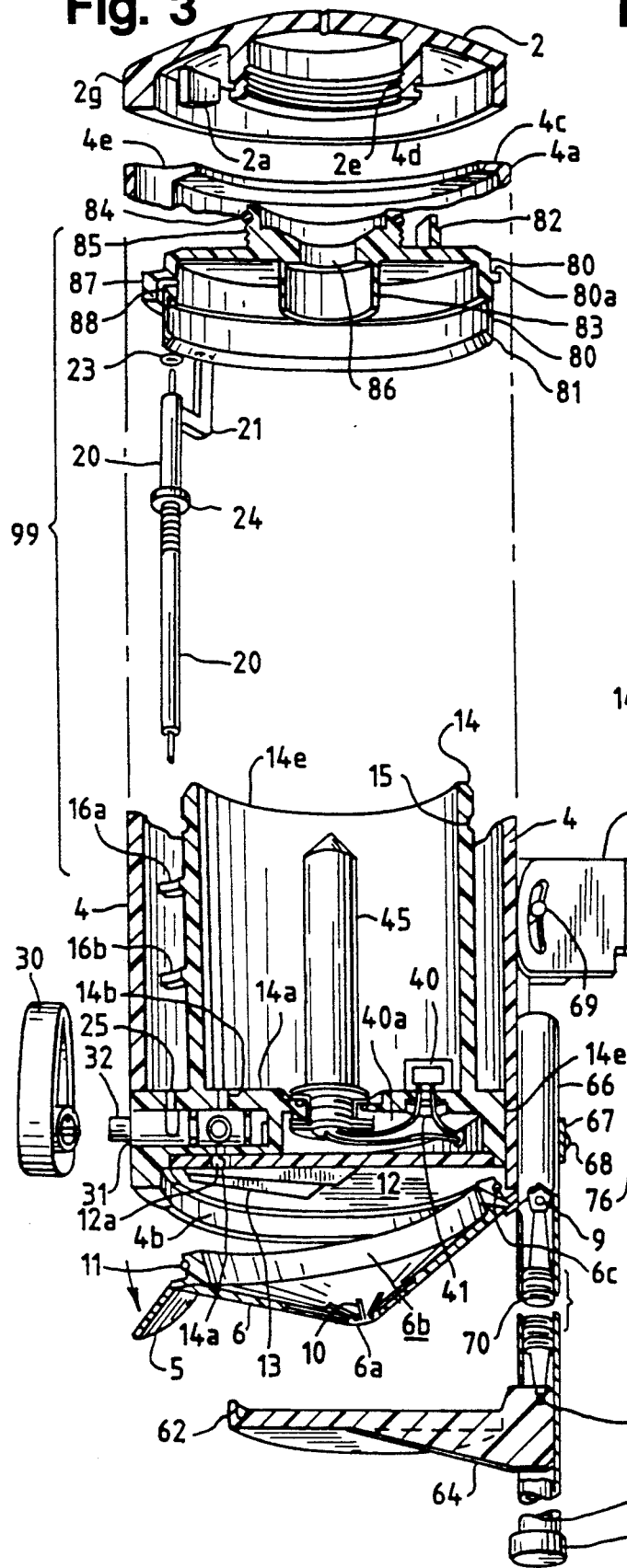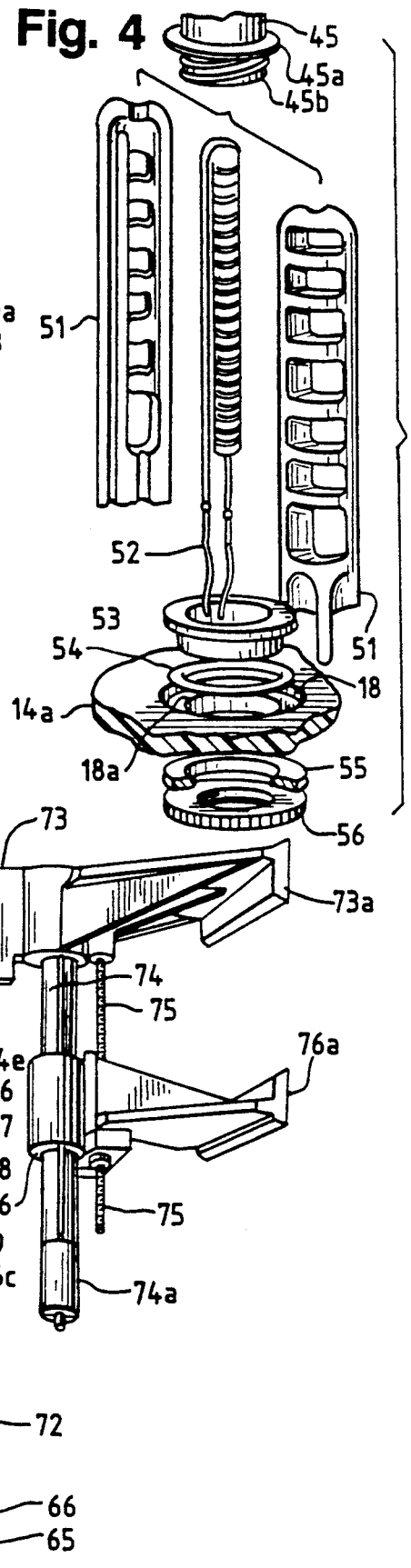

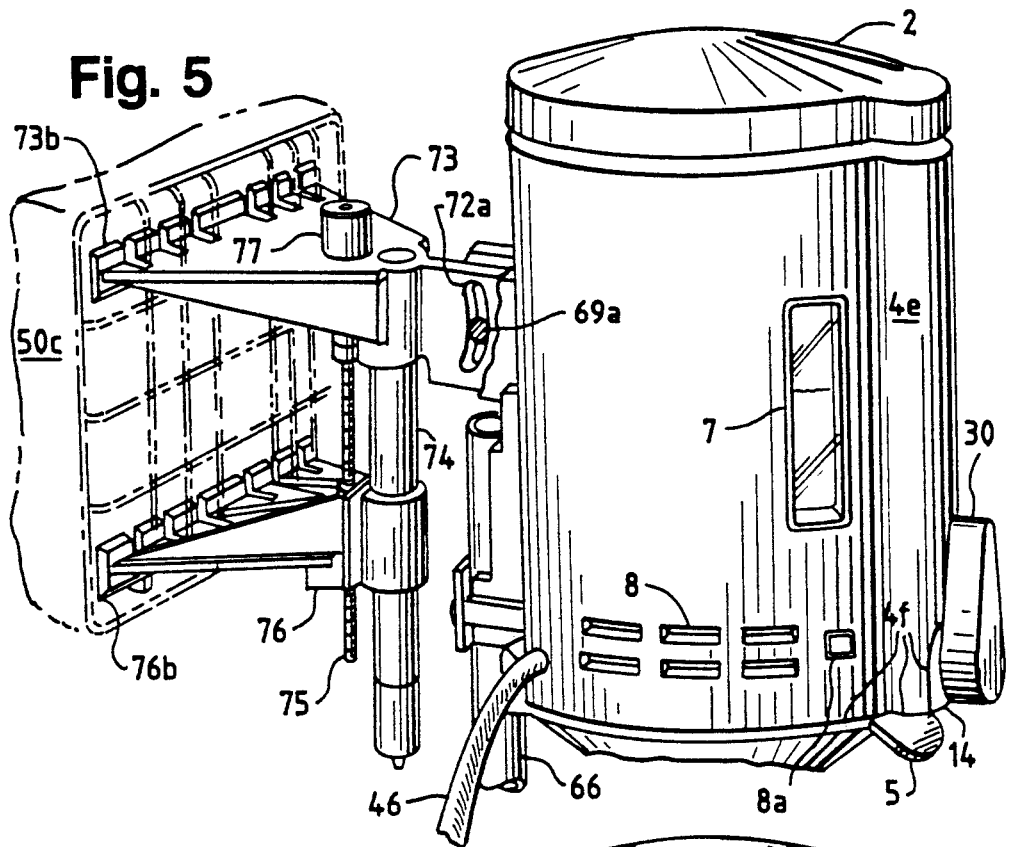
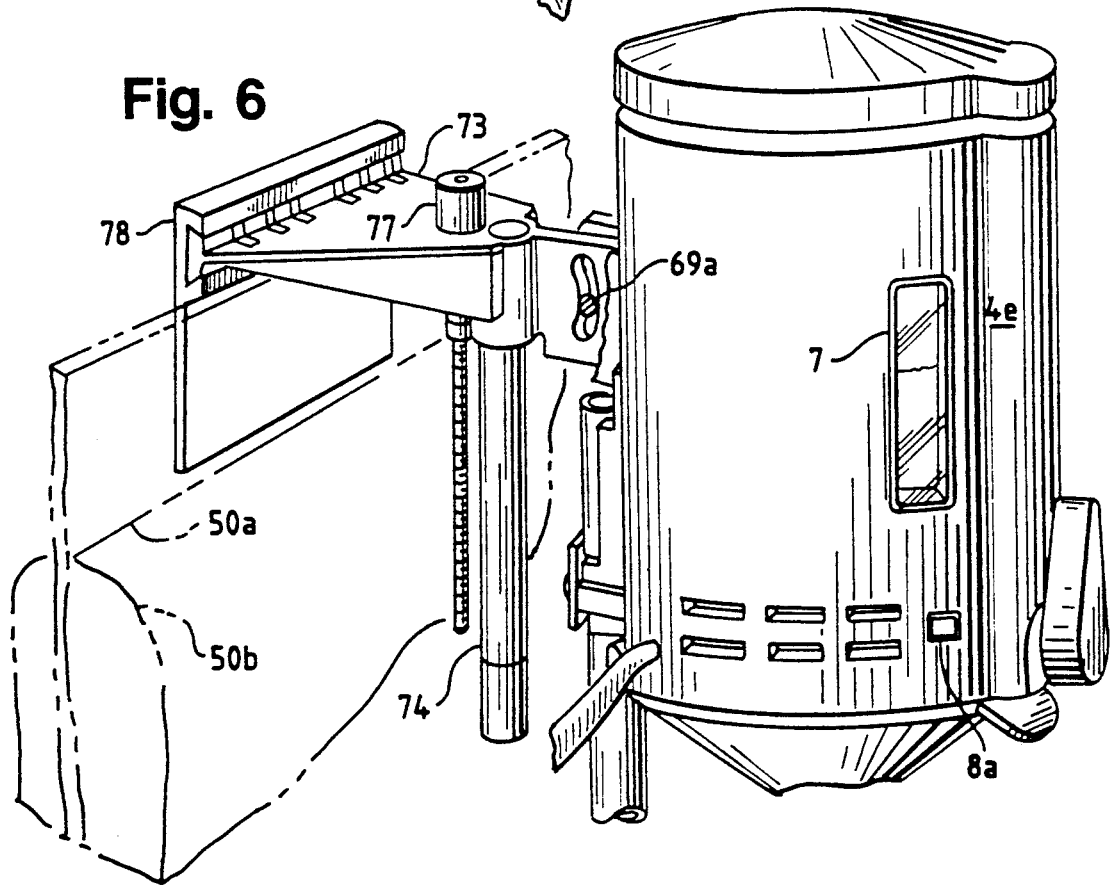

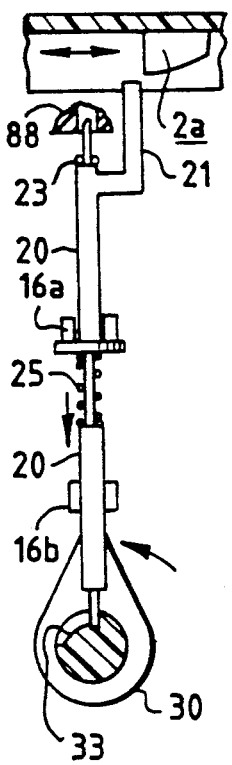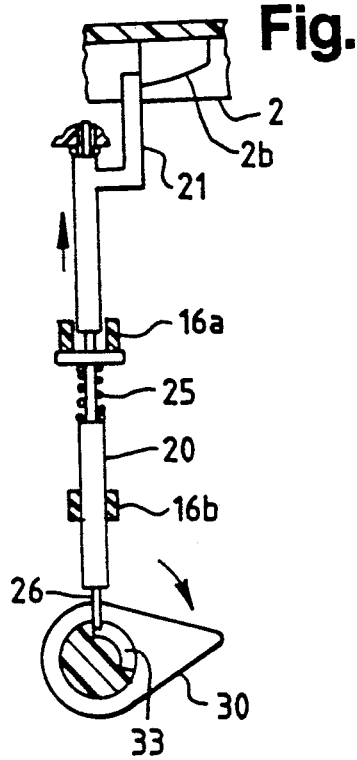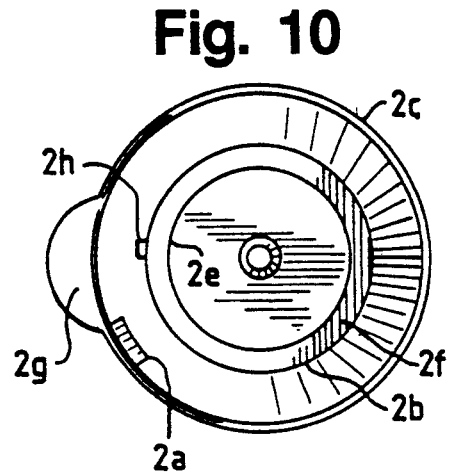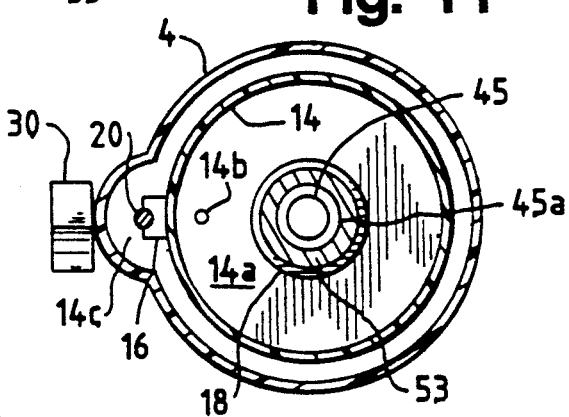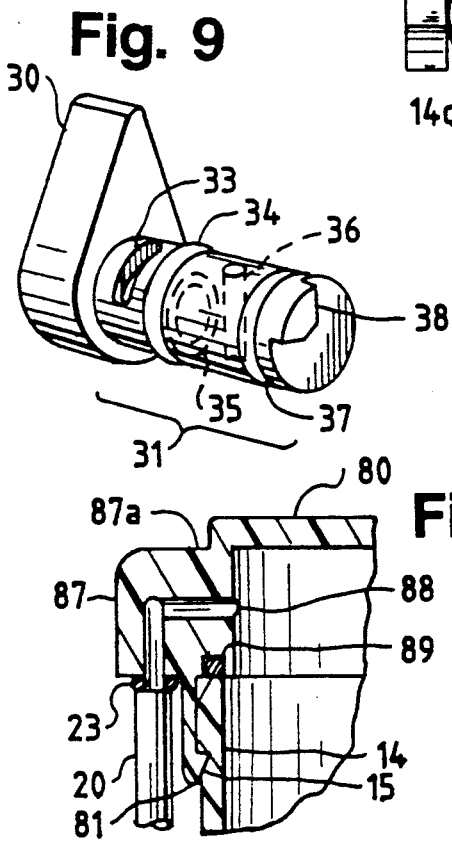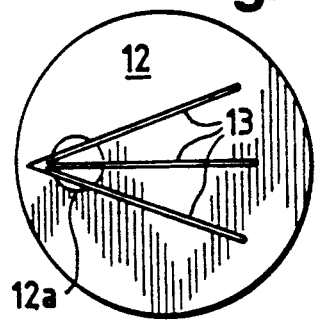

PRESSURIZED HEATING APPARATUS FOR MAKING COFFEE IN AN AUTOMOBILE

BACKGROUND OF THE INVENTION

The invention relates to a pressurizable water heating apparatus to make coffee and the like that can be operated in a vehicle in motion, such as an automobile.

Various devices have been made for making coffee in automobiles. One such device is shown in U.S. Pat. No. 4,151,790, which is comprised of multiple chambers, a water supply line, and a lever or control arm pivotally positioned as part of the control circuit. It further provides that the heating chamber be of smaller capacity than the separate water reservoir (chamber), requiring a repeated heating and discharge action, i.e. a cycling action, operatively controlled by levers, control arms, or solenoid means. With the exception of the heating chamber, none of the foregoing elements nor the cycling operation is required or taught by the present invention. Moreover, the heated liquid from the heating chamber of the present invention is transferred to the ground coffee by gravity—there being no need for the heating chamber to function as a heat pump to force the water out of the heating chamber through a discharge tube to the ground coffee as is required in the above referenced patent.

Another patent, U.S. Pat. No. 4,382,402, reveals a portable coffee maker for automobile use which discloses two "chambers defined by walls", one of which is the heating chamber. Said chambers defined by walls are open at the top and further comprise lid means to cover said chambers. The present invention teaches a sealable heating chamber with closable openings which may be operated under pressure for more efficient operation. The disclosure in '402 further requires the use of a means to heat the water and direct the same to a second chamber, such as a conventional percolator. Such a combined means is neither required nor taught by the present invention. Instead, the present invention teaches a separate electrical heating means immersed in the heating chamber fluid and extending through and closing the electrical opening in the heating chamber. Additionally, the '402 patent provides a means to position but not to secure the receiving cup. A receiving cup securing means is taught by the present invention.

Another patent of general interest is U.S. Pat. No. 3,413,909 which refers generally to an espresso machine that requires a volume of atmospheric air substantially greater than the volume of water in the heating chamber to expel the heated water from the chamber and force it through a charge of beverage-producing material contained in a removable receptacle. The present invention does not require such air to water ratio since the heated water is discharged from the heating chamber not by pressurized expulsion but by gravity. The present invention discloses a vent opening in the heating chamber to release the chamber pressure after the fluid heating process. Moreover, the espresso maker disclosed in patent '909 is not designed for automobile use and it discloses an electrical heating element which is external to the heating chamber and in contact with (embedded in) the chamber wall. In contrast, the heating means of the instant invention protrudes into the heating chamber and is immersed in the heating chamber fluid.

Other patents of general interest are related U.S. Pat. Nos. 3,793,933 and 3,844,206, that disclose pressurized heating chamber devices for non-automotive use. The coffee maker and the infuser, disclosed respectively in '933 and '206, both require a thermally responsive valve means controlling the fluid passage from the heating chamber that regulates a thermal pumping process. Neither the foregoing element nor the method of operation disclosed is taught or required by the present invention. Moreover, '206 discloses control means responsive to the level of infusive material in the heating chamber. Such control means are neither disclosed nor required by the present invention.

Some of the drawbacks to the previous designs of automobile coffee makers is that they are inefficient—consuming an excessively long period of time to heat the water in order to make coffee.

In regard to the foregoing pressurized designs, none teach brewing chambers that operate at the safer atmospheric pressure as does the present invention. Moreover, they are generally more complicated to operate, cannot be mounted in an transport vehicle, nor are they adapted to operate within the electrical constraints of an automobile.

Although there have been many devices disclosed in the prior art which accomplish the purpose of heating fluid in an automobile, for the making of coffee and the like, none are known to the applicant which comprise a ventable pressurized heating chamber that discharges the heated liquid by gravity alone, in a safe, unpressurized manner. The present invention further provides an efficient heating means disposed within the heating chamber and means to mount the device to the automobile and to secure a receiving cup.

ADVANTAGES OF THIS INVENTION

The apparatus of the present invention provides an efficient means to heat water, brew coffee and fill the cup in a tandem, gravity motivated process that avoids spills by the sealable manner in which the heating chamber, brewing chamber and cup are joined.

Unlike the foregoing devices which teach heating means that are external to the heating chamber, the embodiments of the present invention teach an heating means which is immersable in the fluid to be heated within the heating chamber with a high heat transfer element compatible with the nominal 12 volt d.c. electrical system of most automobiles.

Other advantages of the present invention include safety features not taught by the foregoing devices including a heating chamber inlet opening that can be sealed with an interlocking cap which cannot be removed while the discharge valve is closed position, potentially holding in pressurized fluid in the heating chamber that could hazardously escape if the cap alone were removed, temperature regulation, a non-pressurized brewing chamber and a cool-to-touch outer shell.

Thus, this invention provides for the first time a pressurable coffee making apparatus with a sealable heating chamber and a means for interconnecting the closure means for the fluid discharge opening and the closure means for the fluid vent opening, whereby said interconnected closure means are opened and closed simultaneously and the vacuum, if any, created by heating the fluid within the chamber is released when the closure means for the fluid discharge opening is opened.

In brief, this automobile coffee making invention provides a safe, efficient, sealable unit which avoids spills and other hazards to the user, and these features are particularly significant when it is constructed to operate in a passenger automobile.

Still other advantages will be apparent from the disclosure that follows.

SUMMARY OF THE INVENTION

The invention relates to a pressurizable water heating apparatus to make coffee and the like that can be operated in a vehicle in motion, such as an automobile. The present invention discloses an electrical heater used to heat a volume of water which has been accepted into a sealable heating chamber The chamber fluid builds pressure when all openings are closed and heat is applied. Pressure is released through a closable vent in the heating chamber through an interconnection with the discharge valve, and the heated water is allowed to drain out of the heating chamber by gravity. The apparatus of the present invention provides a tandemly connected heating chamber, brewing chamber, and receiving cup. Said brewing chamber, attachable to the bottom of the heating chamber, holds a charge of coffee and receives the heated water for brewing. The coffee cup be sealably secured to the underside of the brewing chamber to receive the brewed coffee. The coffee making apparatus provides an efficient means to heat water, brew coffee and fill the cup in a tandem, gravity motivated process that avoids spills by the sealable manner in which the heating chamber, brewing chamber and cup are joined.

The apparatus disclosed by the present invention can be mounted to the cigarette lighter outlet of an automobile dashboard, its air directing grill or the car door.

The heating apparatus further comprises safety features including a heating chamber inlet opening that can be sealed with an interlocking cap that cannot be removed while the discharge valve is closed position, potentially holding in pressurized fluid in the heating chamber that could hazardously escape if the cap alone were removed, temperature regulation, a non-pressurized brewing chamber and a cool-to-touch outer shell.

BRIEF DESCRIPTION OF THE DRAWING

Preferred embodiments of the invention are described hereinafter with reference to the accompanying drawing wherein:

FIG. 3 is an exploded side elevation view of the heating apparatus of FIG. 1 of the present invention taken along the axis of the discharge plug valve stem of FIG. 1, except that the embodiment of the mounting bracket integrally connected to a timer and a male plug is not shown herein, showing an embodiment of a second detachable mounting bracket having an adjustable clamp having an upper claw-like projection element and a lower claw-like projection element mated to the mounting brace; the threaded cap with stopper projection; the upper flange member, top opening and longitudinal body augmentation of the outer shell; a two piece joinable heating chamber—the top chamber portion comprising an annular section open at the bottom with an annular flange with continuous nub and the incoming fluid opening neck protruding into the heating chamber to maintain a volume of air in the top portion thereof, the incoming fluid opening sized to prevent a user from inserting a finger through the opening and making contact with the tubular heating means, and the bottom chamber portion comprising an opening at the top and a peripheral mating groove disposed on the outer surface of said chamber portion below the upwardly extending rim; an elongated piston with vent sealing means, cantilevered cap locking arm, and spring biasing means; piston guides attached to the outer surface of the heating chamber; discharge valve body and passageways; discharge plug with passageways, cam groove, sealing means and rotation limits; thermally responsive electrical shut-off means; tubular heating means; electrical cavity; heating chamber annular section for attachment of the brewing chamber; brewing chamber circular upper wall with water spreader means disposed across the opening contained therein; detachable brewing chamber bottom portion, partially opened and hingably secured to the heating chamber, and with a plurality of elongated depressions on the interior surface disposed radially from the outlet opening; and the spring biasing means of the cup securing rod attached to the connecting means of the extended supporting arm of the cup securing platform.

FIG. 4 is an exploded perspective view of the heating means of the embodiment of FIGS. 1 and 2 of the present invention showing an electrical heating means having a generally tubular shaped outer metal cladding with a flange separating said tubular portion from a threaded portion which extends through and seal the electrical opening in the chamber in cooperating engagement with sealing means and a threaded nut; and an elongated densely wound electrical element and elongated insulation means arranged and adapted within said tubular shaped portion of the outer metal cladding.

FIG. 5 is a perspective view of the heating apparatus of FIG. 3 of the present invention showing the outer shell having an elongated generally cylindrical body augmented laterally in one radial direction by a longitudinal projection; the mounting clamp adjustment means; "in use" light; and an embodiment of a third detachable mounting bracket where the upper claw-like projection element and the lower claw-like projection element each have a plurality of claw-like projections securing the heating apparatus to the irregular surface of an air duct directing means of an automobile dashboard, shown in phantom.

FIG. 6 is a perspective view of the heating apparatus of FIG. 5 of the present invention showing an embodiment of a third detachable mounting bracket where the lower clamp element has been removed and a wedge element has been attached to the upper clamp element and inserted into the window cavity of an automobile door, shown in phantom.

FIG. 7 is a side elevation view of the embodiment of the valve-vent-cap interconnecting means of FIG. 3 of the present invention taken looking radially outward from the outside surface of the top portion of the heating chamber, showing an axial view of the discharge plug in an open position across the plane intersecting the variable depth cam groove that is peripherally exposed transverse to the longitudinal axis of said plug; the elongated piston with a rigidly flexible cantilevered arm attached thereto and a spring for biasing said piston axially toward the discharge valve at one end and away from engagement with the fluid vent opening on the other; two sets of piston guides; the vent sealing means attached to the piston; the external fluid vent opening; a partial view of the removable cap with its stopper projection having a bottom contact sloped surface.

FIG. 8 is a side elevation view of the embodiment of the valve-vent-cap interconnecting means of FIG. 7 of the present invention showing the discharge plug valve, the interconnected external vent and cap locking means in an closed position.

FIG. 9 is a perspective view of the embodiment of the discharge valve plug and handle of FIGS. 3 of the present invention showing the rotation limit defined by the quarter portion of a cylinder at the end opposite its handle, the tubular passageway for the fluid discharge, the variable depth cam groove peripherally exposed transverse to the longitudinal axis of said plug, and associated o-rings.

FIG. 10 is a bottom plan view of the embodiment of the cap of FIGS. 1, 3, 5, and 6 of the present invention showing a generally circular cap augmented laterally in one radial direction by a projection adapted to cover the longitudinal projection of the outer shell, a concentric bottom rim of the internally threaded section, a rotation stop and the stopper projection.

FIG. 11 is a top plan view of the embodiment of the present invention taken along the line 11—11 of FIG. 1, showing the discharge valve handle, the vertical wall of the outer shell, the relative location of the piston and piston guides, the heating chamber vertical wall and discharge opening, and the tubular heating element, flange and gasket assembly.

FIG. 12 is a side elevation view of the embodiment of FIG. 3 of the present invention showing the detail of the heating chamber vent and sealing means, and the peripheral mating groove disposed on the outer surface of the bottom chamber portion below the upwardly extending rim matingly engaged with the annular flange with continuous nub of the top chamber portion of the heating chamber.

FIG. 13 is a bottom plan view of the embodiment of FIG. 3 of the present invention showing the circular plate which forms the upper wall of the brewing chamber with an opening disposed therein and the water spreader means disposed across the underside of the plate opening.

DETAILED DESCRIPTION OF THE INVENTION

Figure 1:
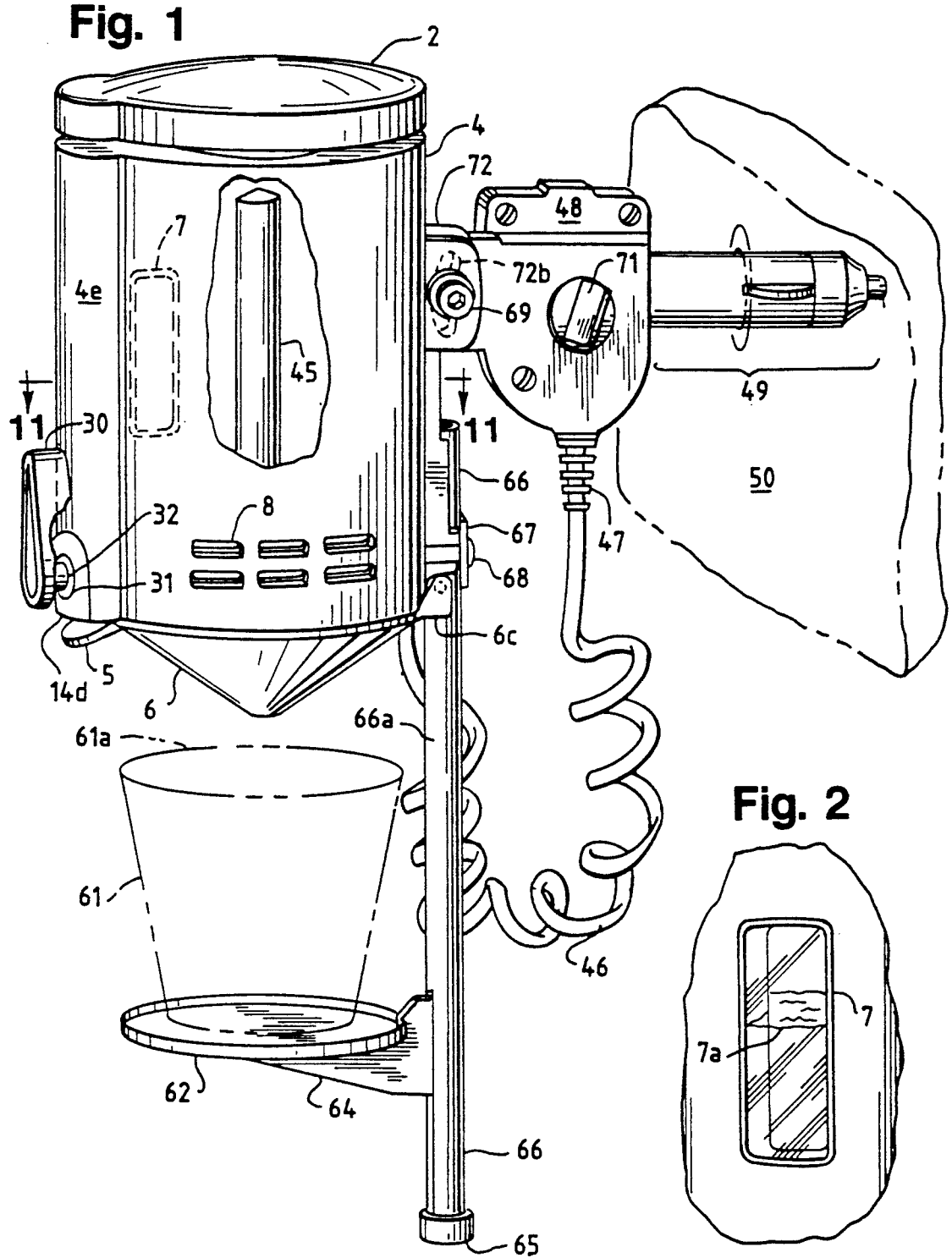
FIG. 1 is a perspective view of a first preferred embodiment of the heating apparatus of the present invention showing a removable cap for the incoming chamber fluid opening in a closed position; an outer shell snugly fit over the heating chamber, partially cut away to show the tubular heating element disposed within the heating chamber, and showing a plurality of heat vents disposed in the outer shell and lower annulus of the heating chamber, and a chamber level sight opening, shown in phantom, disposed in the outer shell; a mounting brace secured to said outer shell mated to a mounting bracket integrally connected to a timer and a male plug for mounting to the cigarette lighter outlet of an automobile, shown in phantom; a cup, shown in phantom, resting on the cup securing platform distended from its upward spring biased position to show the funnel-shaped section of the bottom portion of the brewing chamber shown attached to the bottom of the heating chamber; and the chamber discharge valve stem and handle.

The preferred embodiments depicted in the drawing include a pressurizable water heating apparatus adapted to make coffee and the like that can be mounted to and operated in a vehicle in motion, such as an automobile. The heating apparatus of the present invention provides a sealingly stacked heating chamber, brewing chamber, and coffee cup secured thereto.

The heating chamber cavity is suitably sized to accept a volume of fluid with a closable fluid opening positioned in the top portion of the chamber suitably sized and adapted for incoming fluids, and a closable fluid opening positioned in the bottom portion of the chamber suitably sized and adapted for discharging said fluids, and a closable vent opening positioned in the top portion of the chamber suitably sized and adapted to release vacuum, if any; an electrical heating means; a means for connecting the electrical heating means to an electrical power source; closure means for each of the fluid chamber openings; and a means for interconnecting the closure means for the fluid discharge opening and the closure means for the fluid vent opening, whereby said interconnected closure means are opened and closed simultaneously and the vacuum, if any, created by heating the fluid within the chamber is released when the closure means for the fluid discharge opening is opened.

The discussion that follows, without limiting the scope of the invention, will refer to the invention as depicted in the drawing, showing an apparatus that will heat fluids, such as water, in a sealable heating chamber.

FIG. 1 shows an exterior view of the heating apparatus for making coffee and the first preferred embodiment of the heating apparatus of the present invention of arranged for mounting to a automobile cigarette lighter outlet.

Figure 2:
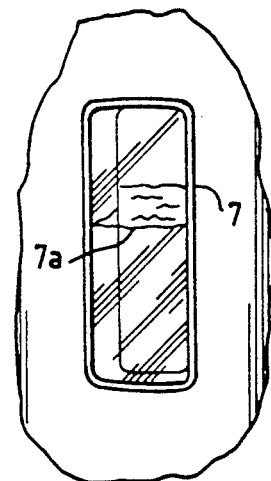
FIG. 2 is a perspective view of a chamber level sight opening in the outer shell exposing the level of fluid in a translucent heating chamber of the embodiment of FIG. 1.

The heating apparatus comprises a removable cap 2 for closing the incoming chamber fluid opening; a tubular heating element 45 disposed within the heating chamber; an outer shell 4 snugly fit over the heating chamber 99; and showing a plurality of heat vents 8 disposed in the outer shell 4 and heating chamber 99, and a chamber level sight opening 7, shown in phantom, disposed in the outer shell 4. A detailed perspective view of the chamber level sight opening 7 in the outer shell 4 exposing the level of fluid 7a in a translucent heating chamber 99 is illustrated in FIG. 2.

The apparatus of the present invention further comprises a mounting brace 72 with an elongated hole 72b secured to said outer shell 4 and adjustably mated by a screw and nut assembly 69 to a mounting bracket 48 integrally connected to a control means, such as a timer 71, and an electrical male plug 49 for mounting to the cigarette lighter outlet of an automobile 50. The electrical cigarette lighter plug and timer assembly 48 is connected to the heating element by a standard electrical cord 46 of sufficient length to allow the heating apparatus to be mounted to other locations within the automobile while the male plug 49 is engagedly connected.

The cup 61, shown in phantom in FIG. 1, is secured to the funnel-shaped section of the bottom portion of the brewing chamber 6 by an upward spring biased cup securing platform 62. The brewing chamber 6, which is hingably attached 9 to the bottom annular section of the heating chamber 4b, is opened by depressing its exposed tongue 5. The exterior of the heating apparatus as depicted in FIG. 1 further shows the exposed chamber discharge valve stem 32, plug 31, and handle 30. As will later be discussed, the discharge valve handle interconnectedly controls the cap locking means and the closure opening for the chamber vent.

Some of the interior embodiments of the present invention are shown in FIG. 3 wherein an elongated sealable heating chamber 99, is comprised of two joinable heating chamber pieces—a top chamber portion 80 comprising annular section open at the bottom with an annular flange 80b with continuous nub 81 and an incoming fluid opening neck 83 protruding into the heating chamber to maintain a volume of air in the top portion thereof, the incoming fluid opening 86 is suitably sized and adapted to prevent a user from inserting a finger through the opening and making contact with either the heated water or the tubular heating means 45 which may be disposed therein; and a bottom chamber portion 14 comprises an opening at the top and a peripheral mating groove 15 disposed on the outer surface of said chamber portion below the upwardly extending rim 14e.

The top chamber portion 80 snugly fits over the upwardly extending rim 14e of the bottom chamber portion 14 and matingly engages said continuous nub 81 of the annular flange of the top chamber portion with the mating groove 15 of the bottom chamber portion to sealably join the top and bottom chamber portions to form a generally cylindrical elongated heating chamber 99.

A rotatable cap 2 with an internally threaded section 2e is employed in the embodiment of FIG. 3 which threadedly engages the incoming fluid opening 86 in the top portion 80 of the heating chamber having an externally threaded section 83 for threaded engagement with said internally threaded section of the cap 2.

A preferred embodiment of the present invention teaches an incoming fluid closure means, here a cap 2, which can be interlocked with the closure means for the heating chamber fluid discharge 14b.

The means for interconnecting the heating chamber discharge valve 31 with the vent opening 88 and the cap 2 comprises a piston 20 attached to a vent sealing means 23, cantilevered arm 21, biasing means 24, for biasing said piston axially toward the discharge valve 31 at one end and away from engagement with the fluid vent opening 88 at the other. Piston guides 16a attached to the outer surface of the heating chamber maintain the lateral disposition of the piston 20 and at least one set of piston guides engages the means for biasing, to backstop the piston's spring biasing means 24.

The closure means for the discharge fluid opening is a plug valve comprising a plug 31 cooperating with a valve stem 32 and handle 30. The plug 31 is seated in a generally cylindrical discharge valve body 19, integral to and extending below the discharge opening 14b of said heating chamber 99 and transverse to said heating chamber, having an outermost end that extends outwardly beyond the radius of the heating chamber and has an opening 25 arranged and adapted to form a passageway for said piston 20 in that portion of the plug valve body 14c extending outwardly beyond the radial boundary of the heating chamber and having additional openings 14d in said body, extending below and in communication with the fluid discharge opening 14b, arranged and adapted to form a passageway for the chamber fluid discharge. The innermost longitudinal boundary of the plug valve body being defined by two parallel semi-circular sectors forming a further half portion of a cylinder at the innermost end of the valve cavity defined thereby.

The plug 31 having a generally cylindrical shape sized to snugly fit into said valve cavity and having a tubular passageway 36 extending below and in communication with the fluid discharge opening when said plug is matingly engaged in an open position in the valve body. The plug further comprises a quarter portion of a cylinder 38 at the end opposite its exposed handle 30, arranged and adapted to cooperatingly engage the half portion of the cylinder at innermost end of said valve cavity 19, to limit the rotation of said plug to a quarter turn.

The plug further comprises a variable depth cam groove 33 peripherally exposed transverse to the longitudinal axis of said plug, arranged and adapted for cooperating engagement with the interconnecting piston 20, whereby the sealing means end of the piston 22 being biasedly arranged and adapted to be disengaged from the fluid vent opening 88 when said discharge valve 31 is in an open position and said piston 20 in cooperating engagement with the cam groove 33 of said valve adaptedly positioning the sealing means 23 attached to the piston in a sealing engagement with the fluid vent opening 88 when the discharge valve 31 is rotated to a closed position, interconnecting the discharge valve 31 and the sealing means 23 for fluid vent opening to cooperatively open and close simultaneously.

Additionally, attached to the piston 20 is a rigidly flexible cantilevered arm 21 and to the cap 2 a stopper projection 2a on the bottom surface of the cap facing toward the heating chamber 99 during engagement. The piston arm 21 is biasedly arranged and adapted with said piston 20 to be unengaged from the stopper projection 2a when the discharge valve 31 is in an open position. The piston 20 and piston arm 21 are positioned in an engaging position with the vent opening 88 and the stopper projection 2a, respectively, when the discharge plug valve 31 is in a closed position. (See FIG. 8.)

The stopper projection 2a has a bottom contact surface 2b sloped upward in the clockwise rotational direction of engagement of said cap when viewed from the top of said cap and the piston arm 21 is made from a sufficiently flexible material, to slide over said sloped stopper projection 2a when the piston attached to said arm is engagedly connected to a closed discharge valve 31, whereby chamber incoming fluid opening 86 is closed by tightening of the threaded engagement, 2e and 85, respectively, between the cap 2 and the incoming fluid opening 86 of the top portion of the heating chamber 80; and said cap 2 is rotatably blocked from removal by the cantilevered piston arm 21 engagedly connected to a closed discharge valve 31. (See FIG. 7.)

The generally cylindrical body of the heating chamber further comprises, in a portion of an annulus 14e concentrically connected to the lower portion thereof, a cavity 40a wherein the electrical heating means 45 and electrical shut-off means 40 may be disposed adjacent to the discharge valve body 14c.

The heating chamber further comprises an electrical opening 18a in the bottom portion of said chamber 14a, which may comprise a seating recess 18, in communication with said electrical cavity 40a suitably sized and adapted to accept an electrical heating means 45 having a generally tubular shaped outer metal cladding with a flange 45a separating said tubular portion from a threaded portion 45b, which is arranged and adapted to extend through and seal the electrical opening 18a in the chamber in cooperating engagement with sealing means, 54 and 55, such as washers, and a threaded nut 56.

The electrical heating 45 means further comprises an elongated densely wound electrical element 52 and elongated insulation means 51 arranged and adapted within said tubular shaped portion of the outer metal cladding, whereby the portion of said electrical heating means 45 extending through said chamber opening is immersable in the heating chamber fluid.

A preferred embodiment of the apparatus of the present invention provides a thermally responsive electrical shut-off means 40 positioned in the heating chamber electrical cavity 40a where it can respond to the heating chamber fluid temperature and which is operatively connected to said electrical heating means 45 to regulate the flow of electrical energy, particularly when the chamber is at an excessive temperature. Additionally, an electrical control means 71 operatively connected to the electrical heating means 45 is provided which regulates the flow of electrical energy to the electrical heating means and may take the form of a timer 71.

Extending below the discharge valve 31, the heating chamber comprises a further annular section 4b connected thereto and concentric therewith for snugly fitting the top portion of a brewing chamber 12. The brewing chamber is suitably sized to hold a charge of beverage producing material, such as ground coffee, and has a circular plate 12 sized to snugly fit in the top portion of said annular section 4b, to form an upper wall of said brewing chamber. The circular plate 12 contains an opening 12a disposed in communication with the discharge valve outlet for passage of the heating chamber effluent with a water spreader means 13 disposed across the underside thereof, to disburse the heated water transferred to the brewing chamber.

The annular section 4b further accepts a detachable brewing chamber bottom portion comprising an upper annular section 6b arranged and adapted to snugly fit within the heating chamber annular section 4b, open at the top having an integrally connected funnel-shaped section 6 containing an outlet opening 6a for fluid discharge and a plurality of elongated depressions 10 disposed radially from said outlet opening 6a on the interior surface of said funnel-shaped section 6, to support a charge of beverage producing material, such as ground coffee. The coffee may be packaged in a paper filter or a conventional screen filter may be employed to isolate the coffee grounds from the discharge effluent. The brewing chamber bottom portion may be hingably 6c secured to the heating chamber, as illustrated in FIG. 3.

The preferred embodiments of the present invention include a means for securing a removable cup comprising a cup securing platform 62 having a disk-like shape integrally attached to a supporting arm 64 on the bottom side thereof, an elongated hollow rod 66 having a spring biasing means 70 disposed therein and a means, 67 and 68, for attaching said rod to the heating chamber.

The supporting arm 64 extends radially in one direction beyond the radius of said platform and has a connecting means 72, such as a hole, disposed in said extended section thereof. The rod 66 has a longitudinal opening 66a, of suitable width to accept a portion of the extended section of said supporting arm 64 and of suitable length for the cup supporting platform to be drawn away from the heating chamber to accept a removable cup 61 on the top side thereof.

A spring biasing means 70 arranged and adapted to attach at its lower end to the connecting means 72 of the supporting arm 64 and to a fixed point on the rod 9 at its other end, whereby a removable cup 61 may be up-rightly placed on the securing platform 62 and its upper rim 61a sealable secured to the underside of the brewing chamber 6.

The heating apparatus further comprises an outer shell 4 having an elongated generally cylindrical body with an upper flange member 4c and augmented laterally in one radial direction by a longitudinal projection 4e. The outer shell 4 is arranged and adapted to snugly fit and radially enclose the heating chamber body 99, the means for interconnecting the discharge valve and the closure means for the fluid vent opening, i.e. the piston 20, etc., and an annular air space surrounding a portion of the heating chamber body, with an opening at the top 4d suitably sized and adapted to expose the incoming fluid opening 86 positioned in the top portion of the heating chamber 80, and an irregularly shaped opening 4f at the bottom suitably sized and adapted to expose the outer portion of the discharge valve 31 and the opening defined by the annular section 4b integrally connected to the heating chamber body extending below the plane of the discharge valve.

The outer shell 4 allows for the handling of the heating apparatus while it is in use without causing injury.

As the illustrated embodiments of the present invention are adapted to used in transport vehicles, such as automobiles, the electrical heating means 45 is operatively adapted to an vehicular power source, nominally 12 volts dc, and the means for connecting the electrical heating means to an electrical power source comprises a male plug 49 suitably sized and adapted to fit snugly into the receptor portion of a vehicular cigarette lighter opening. When the mounting bracket that is integrally connected to said male plug 49 is detachably mated to the apparatus mounting brace 72 secured to the heating apparatus, as shown in FIG. 1, the heating apparatus may be mounted to the receptor portion of a vehicular cigarette lighter opening.

Alternative mounting means are comprised of a second detachable mounting bracket having an adjustable clamp 73 and an attachable wedge element 78. The adjustable clamp 73, depicted in FIG. 3, has an upper element 73 and a removable lower element 76, each having at least one cooperating claw-like projection (73a and 76a, respectively, in FIG. 3.) arranged and adapted to engagedly secure said heating apparatus to both regular and irregular mounting surface, such as the regular surface of an automobile dashboard and the irregular surface of an air duct directing means 50c of an automobile dashboard. For the latter, a plurality of claw-like projections is required. (See 73b and 76b of FIG. 5.)

The attachable wedge element 78 is arranged and adapted to attach to the claw-like projection of said upper clamp element 73 when the lower clamp element 76 is removed. With the wedge element attached, the heating apparatus can be mounted to an automobile door 50b when the attached wedge element 78 is inserted into the window cavity 50a thereof.

In the preferred embodiments of the heating apparatus of the present invention, the portion of the annulus of the heating chamber 14e that defines the boundary of the electrical cavity 40a adjacent to the discharge valve body 14c comprises a plurality of heat vents 8 and the outer shell comprises a plurality of heat vents 8 in communication with the heat vents of the heating chamber, to allow for the circulation of air to remove waste heat.

The electrical heating means further comprises an "in use" light 8a operatively connected and disposed in an opening in said annulus in communication with an opening disposed in the outer shell, to allow for the monitoring of electrical energy to the electrical heating means.

The outer shell may further comprise a heating chamber level sight opening 7 arranged and adapted to expose the level of fluid 7a in a heating chamber constructed of a translucent material.

It is believed that to optimize the transportability of the apparatus of the present invention that the volume of fluid, such as water, should be limited to a few cups of liquid. Increased capacity will limit the efficacy of the disclosed mounting means. Moreover, the heating chamber appurtenances may be integrally formed for greater structural integrity.

A second preferred embodiment of the heating chamber of the present invention would include an apparatus for heating fluids, such as water, comprising a sealable heating chamber suitably sized to accept a volume of fluid with a closable fluid opening suitably sized and adapted for channelling said fluid, and a closable vent opening suitably sized and adapted to release vacuum chamber pressure or, if any; an electrical heating means; a means for connecting the electrical heating means to an electrical power source; closure means for each of the fluid chamber openings; and a means for interconnecting the closure means for the fluid channelling opening and the closure means for the fluid vent opening, whereby said interconnected closure means are opened and closed simultaneously and the vacuum, if any, created by heating the fluid within the heating chamber is released when the closure means for the fluid channelling opening is opened.

The variant of the second preferred embodiment of the heating chamber of the present invention relate primarily to the use of one channelling chamber orifice in lieu of the two disclosed in the first preferred embodiment. The second preferred embodiment performs particularly well when secured to a means for rotatably mounting said apparatus to an object, such as an automobile.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

What is claimed is:

1. An apparatus for heating fluids, such as water, said apparatus comprising:
   (a) a sealable heating chamber suitably sized to accept a volume of fluid with a closable fluid opening positioned in the top portion of the chamber suitably sized and adapted for incoming fluids, and a closable fluid opening positioned in the bottom portion of the chamber suitably sized and adapted for discharging said fluids, and a closable vent opening positioned in the top portion of the chamber suitably sized and adapted to release chamber pressure or vacuum, if any,
   said heating chamber further comprising an elongated generally cylindrical body having a portion of an annulus concentrically connected thereto and extending below the bottom portion thereof, said annulus portion defining the periphery of a cavity in which electrical heating means and electrical shut-off means and closure means extending below the fluid opening that is positioned in the bottom portion of the chamber may be disposed;
   (b) an electrical heating means;
   (c) a means for connecting the electrical heating means to an electrical power source;
   (d) closure means for each of the fluid chamber openings,
   said closure means being movable from an open position or a closed position;
   (e) a brewing chamber having an annular section connected the heating chamber body and concentric therewith and extending below the closure means for the fluid opening positioned in the bottom portion of the chamber for discharging said fluids,
   said brewing chamber being suitably sized to hold a charge of beverage producing material, such as ground coffee; and
   (f) a means connected to the heating chamber body for securing a removable cup in an upright position concentric with the heating chamber body and extending said cup below and in sealing engagement with the brewing chamber,
   whereby a tandem arrangement with the heating chamber positioned on top, the removable cup positioned on the bottom, and the brewing chamber positioned in between permits a volume of fluid in the heating chamber to be discharged by the force of gravity, first into the brewing chamber and then into the uprightly positioned removable cup.

2. An apparatus for heating fluids, such as water, said apparatus comprising:
   (a) a sealable heating chamber suitably sized to accept a volume of fluid with a closable fluid opening positioned in the top portion of the chamber suitably sized and adapted for incoming fluids, and a closable fluid opening positioned in the bottom portion o the chamber suitably sized and adapted for discharging said fluids, and a closable vent opening positioned in the top portion of the chamber suitably sized and adapted to release chamber pressure or vacuum, if any;
   (b) an electrical heating means;
   (c) a means for connecting the electrical heating means to an electrical power source;
   (d) closure means for each of the fluid chamber openings,
   said closure means each being movable from an open position or a closed position, and said closure means for incoming fluid chamber opening also being independently movable from an open position to a closed position; and
   (e) a means for selectively opening and closing the closure means for the fluid discharge opening and a means for interconnecting the closure means for the fluid discharge opening and the closure means for the fluid vent opening for transmitting the position of the closure means for the fluid discharge opening to a corresponding position of the closure means for the fluid vent opening,
   whereby said interconnected closure means are opened and closed simultaneously and the chamber pressure or vacuum, if any, created by heating the fluid within the chamber is released when the closure means for the fluid discharge opening is opened; and (f) further comprising a means for interconnecting the closure means for the fluid discharge opening and the closure means for the incoming fluid chamber opening for transmitting the position of the closure means for the fluid discharge opening to a locking means for the closure means for the incoming fluid chamber opening, whereby said closure means for the incoming fluid chamber opening may be moved from an open position to a closed position and may not be moved from a closed position to an open position when the discharge valve is in a closed position.

3. The heating apparatus of claim 1, further comprising an electrical shut-off means thermally responsive to the heating chamber fluid temperature and operatively connected to said electrical heating means, said shut-off means being arranged and adapted to regulate the flow of electrical energy to the electrical heating means when the chamber is at an excessive temperature.

4. The heating apparatus of claim 1, wherein the heating chamber further comprises a means to maintain a volume of air in the top portion thereof, to facilitate the heating process.

5. The heating apparatus of claim 1, wherein the heating chamber further comprises an electrical opening in the bottom portion of said chamber suitably sized and adapted to accept an electrical heating means and wherein said electrical heating means is arranged and adapted to extend through and seal the electrical opening in the chamber, whereby the portion of said electrical heating means extending through said chamber opening is immersable in the heating chamber fluid.

6. The heating apparatus of claim 1, further comprising a non-pressurized brewing chamber suitably sized to hold a charge of beverage producing material, such as ground coffee.

7. The heating apparatus of claim 1, wherein the electrical heating means is operatively adapted to an vehicular power source, nominally 12 volts dc, and the means for connecting the electrical heating means to an electrical power source comprises a male plug suitably sized and adapted to fit snugly into the receptor portion of a vehicular cigarette lighter opening.

8. The heating apparatus of claim 1, further comprising a means for securing a removable cup.

9. The heating apparatus of claim 1, further comprising an outer shell, whereby the outer shell of the apparatus can be handled while the heating apparatus is in use without causing injury.

10. The heating apparatus of claim 1, further comprising a means for mounting said apparatus to an object, such as an automobile.

11. The heating apparatus of claim 1, wherein the means for connecting the electrical heating means to an electrical power source comprises an electrical control means operatively connected to said electrical heating means, said control means being arranged and adapted to regulate the flow of electrical energy to the electrical heating means.

12. An apparatus for heating fluids, such as water, said apparatus comprising:

(a) a sealable heating chamber suitably sized to accept a volume of fluid with a closable fluid opening positioned in the top portion of the chamber suitably sized and adapted for incoming fluids, and a closable fluid opening positioned in the bottom portion of the chamber suitably sized and adapted for discharging said fluids, and a closable vent opening positioned in the top portion of the chamber suitably sized and adapted to release chamber pressure or vacuum, if any;

(b) an electrical heating means;

(c) a means for connecting the electrical heating means to an electrical power source;

(d) closure means for each of the fluid chamber openings, said closure means being movable from an open position or a closed position;

(e) a means for selectively opening and closing the closure means for the fluid discharge opening and a means for interconnecting the closure means for the fluid discharge opening and the closure means for the fluid vent opening for transmitting the position of the closure means for the fluid discharge opening to a corresponding position of the closure means for the fluid vent opening, whereby said interconnected closure means are opened and closed simultaneously and the chamber pressure or vacuum, if any, created by heating the fluid within the chamber is released when the closure means for the fluid discharge opening is opened;

(f) said apparatus further comprises an electrical shut-off means thermally responsive to the heating chamber fluid temperature and operatively connected to said electrical heating means, said shut-off means being arranged and adapted to regulate the flow of electrical energy to the electrical heating means when the chamber is at an excessive temperature;

(g) the closure means for the discharge fluid opening is a plug valve comprising a plug cooperating with a valve stem and handle;

(h) the means for interconnecting the discharge valve and the closure means for the fluid vent opening comprises an elongated piston, a means for biasing said piston axially toward the discharge valve at one end and away from engagement with the fluid vent opening on the other, and at least one set of piston guides, said piston guides being attached to the exterior surface of the heating chamber and cooperatingly engaged with said means for biasing;

(i) the closure means for the fluid vent opening comprises a sealing means cooperatively attached to the end of the piston arranged and adapted to be placed in sealingly engaged relationship with the end of the fluid vent opening external to the heating chamber;

(j) the heating chamber has an elongated generally cylindrical body and further comprises a portion of an annulus concentrically connected to the heating chamber extending below the bottom portion thereof, said heating chamber further comprising a generally cylindrical discharge valve body extending below the discharge opening of said heating chamber and transverse to said heating chamber, said annulus portion defining the periphery of a cavity wherein the electrical heating means and the electrical shut-off means may be disposed adjacent to the discharge valve body, said plug valve body having an outermost end that extends outwardly beyond the radius of the heating chamber and having an opening arranged and adapted to form a passageway for said piston in that portion of the plug valve body extending outwardly beyond the radial boundary of the heating chamber and having additional openings in said body, extending below and in communication with the fluid discharge opening, arranged and adapted to form a passageway for the chamber fluid discharge, and said valve body defining a valve cavity therein, the innermost longitudinal boundary of said cavity being defined by two parallel semi-circular sectors forming a further half portion of a cylinder at the innermost end of said valve cavity;

(k) said plug valve having a generally cylindrical shape sized to snugly fit into said valve cavity and having a tubular passageway extending below and in communication with the fluid discharge opening when said plug is matingly engaged in an open position in the valve body, said plug further comprising a quarter portion of a cylinder at the end opposite its exposed handle, arranged and adapted to cooperatingly engage the half portion of the cylinder at innermost end of said valve cavity, to limit the rotation of said plug to a quarter turn; and (l) said plug further comprises a variable depth cam groove peripherally exposed transverse to the longitudinal axis of said plug, arranged and adapted for cooperating engagement with said piston, whereby said sealing means end of the piston being biasedly arranged and adapted to be disengaged from the fluid vent opening when said discharge valve is in an open position and said piston in cooperating engagement with the cam groove of said valve adaptedly positioning the sealing means attached to the piston in a sealing engagement with the fluid vent opening when the discharge valve is rotated to a closed position, interconnecting the discharge valve and the closure means for fluid vent opening to cooperatively open and close simultaneously.

13. A heating apparatus as in claims 2, 4, 5, 6, 7, 8, 9, 10 or 11, wherein (a) said apparatus further comprises an electrical shut-off means thermally responsive to the heating chamber fluid temperature and operatively connected to said electrical heating means, said shut-off means being arranged and adapted to regulate the flow of electrical energy to the electrical heating means when the chamber is at an excessive temperature, (b) the closure means for the discharge fluid opening is a plug valve comprising a plug cooperating with a valve stem and handle, (c) the means for interconnecting the discharge valve and the closure means for the fluid vent opening comprises an elongated piston, a means for biasing said piston axially toward the discharge valve at one end and away from engagement with the fluid vent opening on the other, and at least one set of piston guides, said piston guides being attached to the exterior surface of the heating chamber and cooperatingly engaged with said means for biasing;

(d) the closure means for the fluid vent opening comprises a sealing means cooperatingly attached to the end of the piston arranged and adapted to be placed in sealingly engaged relationship with the end of the fluid vent opening external to the heating chamber;

(e) the heating chamber has an elongated generally cylindrical body and further comprises a portion of an annulus concentrically connected to the heating chamber extending below the bottom portion thereof, said heating chamber further comprising a generally cylindrical discharge valve body extending below the discharge opening of said heating chamber and transverse to said heating chamber, said annulus portion defining the periphery of a cavity wherein the electrical heating means and the electrical shut-off means may be disposed adjacent to the discharge valve body, said plug valve body having an outermost end that extends outwardly beyond the radius of the heating chamber and having an opening arranged and adapted to form a passageway for said piston in that portion of the plug valve body extending outwardly beyond the radial boundary of the heating chamber and having additional openings in said body, extending below and in communication with the fluid discharge opening, arranged and adapted to form a passageway for the chamber fluid discharge, and said valve body defining a valve cavity therein, the innermost longitudinal boundary of said cavity being defined by two parallel semi-circular sectors forming a further half portion of a cylinder at the innermost end of said valve cavity;

(f) said plug valve having a generally cylindrical shape sized to snugly fit into said valve cavity and having a tubular passageway extending below and in communication with the fluid discharge opening when said plug is matingly engaged in an open position in the valve body, said plug further comprising a quarter portion of a cylinder at the end opposite its exposed handle, arranged and adapted to cooperatingly engage the half portion of the cylinder at innermost end of said valve cavity, to limit the rotation of said plug to a quarter turn, (g) said plug further comprises a variable depth cam groove periphery exposed transverse to the longitudinal axis of said plug, arranged and adapted for cooperating engagement with said piston, whereby said sealing means end of the piston being biasedly arranged and adapted to be disengaged from the fluid vent opening when said discharge valve is in an open position and said piston in cooperating engagement with the cam groove of said valve adaptedly positioning the sealing means attached to the piston in a sealing engagement with the fluid vent opening when the discharge valve is rotated to a closed position, interconnecting the discharge valve and the closure means for fluid vent opening to cooperatively open and close simultaneously.

14. The heating apparatus of claim 12, further comprising a brewing chamber having (a) an annular section connected to the heating chamber body and concentric therewith and extending below the discharge valve;

(b) a circular plate sized to snugly fit in the top portion of said annular section, to form an upper wall of said brewing chamber, containing an opening disposed in communication with the discharge valve outlet;

(c) water spreader means disposed across the underside of said plate opening, to disburse the heated water transferred to the brewing chamber;

(d) a detachable brewing chamber bottom portion comprising an upper annular section arranged and adapted to snugly fit within the brewing chamber annular section, open at the top having an integrally connected funnel-shaped section containing an outlet opening for fluid discharge and a plurality of elongated depressions disposed radially from said outlet opening on the interior surface of said funnel-shaped section, to support a charge of beverage producing material, such as ground coffee.

15. The heating apparatus of claim 14, wherein the electrical heating means is operatively adapted to an vehicular power source, nominally 12 volts dc, and the means for connecting the electrical heating means to an electrical power source is a male plug suitably sized and adapted to fit snugly into the receptor portion of a vehicular cigarette lighter opening.

16. The heating apparatus of claim 15, further comprising an outer shell having an elongated generally cylindrical body with an upper flange member and augmented laterally in one radial direction by a longitudinal projection, said outer shell being arranged and adapted to snugly fit and radially enclose the heating chamber body, the means for interconnecting the discharge valve and the closure means for the fluid vent opening and an annular air space surrounding a portion of the heating chamber body, said outer shell further comprising an opening at the top suitably sized and adapted to expose the incoming fluid opening positioned in the top portion of the heating chamber, and said outer shell further comprising an irregularly shaped opening at the bottom suitably sized and adapted to expose the outer portion of the discharge valve and the opening defined by the annular section integrally connected to the heating chamber body extending below the plane of the discharge valve, whereby the outer shell of the apparatus can be handled while the heating apparatus is in use without causing injury.

17. The heating apparatus of claim 15, wherein the mounting means comprises a mounting brace secured to the heating apparatus and a mounting bracket detachably mated to said mounting brace, said mounting bracket is integrally connected to said male plug, whereby the heating apparatus may be mounted to the receptor portion of a vehicular cigarette lighter opening.

18. The heating apparatus of claim 16, wherein the mounting means comprises a mounting brace secured to the heating apparatus and a mounting bracket detachably mated to said mounting brace, said mounting bracket is integrally connected to said male plug, whereby the heating apparatus may be mounted to the receptor portion of a vehicular cigarette lighter opening.

19. The heating apparatus of claim 18, wherein the mounting means further comprises a second detachable mounting bracket having an adjustable clamp and an attachable wedge element, said adjustable clamp having an upper element and a removable lower element, each having at least one cooperating claw-like projection arranged and adapted to engagedly secure said heating apparatus to both regular and irregular mounting surface, such as the regular surface of an automobile dashboard and the irregular surface of an air duct directing means of an automobile dashboard, said attachable wedge element being arranged and adapted to attach to the claw-like projection of said upper clamp element when the lower clamp element is removed, whereby the heating apparatus can be mounted to an automobile door when the attached wedge element is inserted into the window cavity thereof.

20. The heating apparatus of claim 19, further comprising a means for securing a removable cup having a cup securing platform having a disk-like shape integrally attached to a supporting arm on the bottom side thereof, an elongated hollow rod having a spring biasing means disposed therein and a means for attaching said rod to the heating chamber, said supporting arm extending radially in one direction beyond the radius of said platform and having a connecting means, such as a hole, disposed in said extended section thereof, said rod having a longitudinal opening of suitable width to accept a portion of the extended section of said supporting arm and of suitable length for the cup supporting platform to be drawn away from the heating chamber to accept a removable cup on the top side thereof, said spring biasing means arranged and adapted to attach at its lower end to the connecting means of the supporting arm and to fixed point on the rod at its other end, whereby a removable cup may be uprightly placed on the securing platform and its upper rim sealable secured to the underside of the brewing chamber.

21. The heating apparatus of claim 20, wherein the closure means for the incoming fluid opening comprises a removable cap and the heating apparatus further comprises a means for locking the cap in a closed position to prevent said cap from being removed when the discharge valve is in a closed position, said cap including an internally threaded section, said incoming fluid opening in the top portion of the heating chamber having an externally threaded section for threaded engagement with said internally threaded section of the cap, said locking means comprising a rigidly flexible cantilevered arm attached to the piston and a stopper projection on the bottom surface of the cap facing toward the heating chamber during engagement, said stopper projection being arranged and adapted to be placed in a lockingly engaged relation with said cantilevered piston arm when the piston is engagedly connected to a closed discharge valve, to block the loosening rotation of a tightened closed cap, said stopper projection having a bottom contact surface sloped upward in the clockwise rotational direction of engagement of said cap when viewed from the top of said cap, said piston arm being biasedly arranged and adapted with said piston to be unengaged from said stopper projection when said discharge valve is in an open position and said piston arm being sufficiently flexible to slide over said stopper projection when the piston attached to said arm is engagedly connected to a closed discharge valve, whereby said opening is closed by tightening of the threaded engagement between the cap and the incoming fluid opening of the top portion of the heating chamber and said cap is rotatably blocked from removal by the cantilevered piston arm engagedly connected to a closed discharge valve.

22. The heating apparatus of claim 21, wherein the heating chamber further comprises an electrical opening in the bottom portion of said chamber, in communication with said electrical cavity, suitably sized and adapted to accept an electrical heating means having a generally tubular shaped outer metal cladding with a flange separating said tubular portion from a threaded portion, said threaded portion being arranged and adapted to extend through and seal the electrical opening in the chamber in cooperating engagement with sealing means and a threaded nut, said electrical heating means further comprising an elongated densely wound electrical element and elongated insulation means arranged and adapted within said tubular shaped portion of the outer metal cladding, said incoming fluid opening suitably sized and adapted to prevent a user from inserting a finger through said opening and making contact with said tubular heating means, whereby the portion of said electrical heating means extending through said chamber opening is immersable in the heating chamber fluid and inaccessible for contact by the user.

23. The heating apparatus of claim 22, wherein said heating chamber is comprised of two joinable portions —a top chamber portion and a bottom chamber portion, said bottom chamber portion comprises an opening at the top and a peripheral mating groove disposed on the outer surface of said chamber portion below the upwardly extending rim, and said top chamber portion comprises an annular section that is open at the bottom with a annular flange with continuous nub arranged and adapted to snugly fit over the upwardly extending rim of the bottom chamber portion and matingly engage said continuous nub of the annular flange of the top chamber portion with the mating groove of the bottom chamber portion, whereby said top and bottom chamber portions are sealable joined.

24. The heating apparatus of claim 23, wherein the incoming fluid opening in the top portion of the heating chamber comprises a neck that protrudes into the heating chamber arranged and adapted to maintain a volume of air in the top portion thereof, to facilitate the heating process.

25. The heating apparatus of claim 24, wherein
(a) the portion of the annulus of the heating chamber that defines the boundary of the cavity adjacent to the discharge valve body comprises a plurality of heat vents and the outer shell comprises a plurality of heat vents in communication with the heat vents of the heating chamber, to allow for the circulation of air to remove waste heat, (b) the electrical heating means further comprises a light operatively connected and disposed in an opening in said annulus in communication with an opening disposed in the outer shell, to allow for the monitoring of electrical energy to the electrical heating means, and (c) the heating chamber having a translucent material structure and the outer shell having a chamber level sight opening arranged and adapted to expose the level of fluid in the heating chamber.

26. The heating apparatus of claim 25, further comprising an electrical control means having a timer.

27. The heating apparatus of claim 26, wherein the volume of fluid that the heating chamber can accept less than 16 ounces.

28. The heating apparatus of claim 27, wherein the elements, comprising each joinable portion of the heating chamber, are integrally formed.

29. An apparatus for heating fluids, such as water, said apparatus comprising:

(a) a sealable heating chamber suitably sized to accept a volume of fluid with a closable fluid opening suitably sized and adapted for channelling said fluid into said chamber when the fluid opening is positioned upwardly and discharging said fluid out of said chamber when the fluid opening is positioned downwardly, and a closable vent opening suitably sized and adapted to release chamber pressure or vacuum, if any, said heating chamber further comprising an elongated generally cylindrical body having a portion of an annulus concentrically connected thereto and extending below the discharge opening thereof, said annulus portion defining the periphery of a cavity in which may be disposed electrical heating means, electrical shut-off means, and closure means extending below the fluid opening adapted for channelling fluid when said opening is positioned downwardly;

(b) an electrical heating means;

(c) a means for connecting the electrical heating means to an electrical power source;

(d) closure means for each of the fluid chamber openings, said closure means being movable from an open position or a closed position;

(e) a brewing chamber having an annular section connected to the heating chamber body and concentric therewith and extending below the closure means extending below the fluid opening adapted for channelling fluid when said opening is positioned downwardly, said brewing chamber being suitably sized to hold a charge of beverage producing material, such as ground coffee; and (f) a means connected to the heating chamber body for securing a removable cup in an upright position concentric with said heating chamber body and extending said cup below and in sealing engagement with the brewing chamber when the fluid opening adapted for channelling fluid is downwardly positioned, whereby a tandem arrangement with the heating chamber having its fluid opening adapted for channelling fluid facing downwardly positioned on top, the removable cup positioned on the bottom, and the brewing chamber positioned in between permits a volume of fluid in the heating chamber to be discharged by the force of gravity first into the brewing chamber and then into the uprightly placed removable cup.

30. The heating apparatus of claim 29, further comprising:
   (a) said apparatus further comprises an electrical shut-off means thermally responsive to the heating chamber fluid temperature and operatively connected to said electrical heating means,
   said shut-off means being arranged and adapted to regulate the flow of electrical energy to the electrical heating means when the heating chamber is at an excessive temperature;
   (b) a brewing chamber suitably sized to hold a charge of beverage producing material, such as ground coffee;
   (c) said electrical heating means being operatively adapted to an vehicular power source, nominally 12 volts dc, and
   the means for connecting the electrical heating means to an electrical power source comprises a male plug suitably sized and adapted to fit snugly into the receptor portion of a vehicular cigarette lighter opening; and
   (d) a means for securing a removable cup.
   (a) said apparatus further comprises an electrical shut-off means thermally responsive to the heating chamber fluid temperature and operatively connected to said electrical heating means,
   said shut-off means being arranged and adapted to regulate the flow of electrical energy to the electrical heating means when the heating chamber is at an excessive temperature;
   (b) a brewing chamber suitably sized to hold a charge of beverage producing material, such as ground coffee;
   (c) said electrical heating means being operatively adapted to an vehicular power source, nominally 12 volts dc, and
   the means for connecting the electrical heating means to an electrical power source comprises a male plug suitably sized and adapted to fit snugly into the receptor portion of a vehicular cigarette lighter opening; and
   (d) a means for securing a removable cup.

31. The heating apparatus of claim 30, further comprising:
   (a) a means to maintain a volume of air in the top portion thereof, to facilitate the heating process;
   (b) an electrical opening in the portion of the heating chamber opposite the channelling fluid opening suitably sized and adapted to accept an electrical heating means and wherein said electrical heating means is arranged and adapted to extend through and seal the electrical opening in the heating chamber, to immerse in the heating chamber fluid;
   (c) a means for connecting the electrical heating means to an electrical power source comprises an electrical control means operatively connected to said electrical heating means,
   said control means being arranged and adapted to regulate the flow of electrical energy to the electrical heating means; and
   (d) outer shell of the apparatus can be handled while the heating apparatus is in use without causing injury.

32. A heating apparatus as in claims 3, 4, 5, 6, 7, 8, 9, 10, 11, 12, 14, 15, 16, 17, 18, 19, 20, 29, 30 or 31, further comprising a means for interconnecting the closure means for the fluid discharge opening and the closure means for the incoming fluid chamber opening for transmitting the position of the closure means for the fluid discharge opening to a locking means for the closure means for the incoming fluid chamber opening,
   whereby said closure means for the incoming fluid chamber opening is locked in a closed position to prevent said closure means from being opened when the discharge valve is in a closed position.

33. An apparatus for heating fluids, such as water, said apparatus comprising:
   (a) a heating chamber suitably sized to accept a volume of fluid with a fluid opening positioned in the top portion of the chamber suitably sized and adapted for incoming fluids, and a closable fluid opening positioned in the bottom portion of the chamber suitably sized and adapted for discharging said fluids,
   said heating chamber further comprising an elongated generally cylindrical body having a portion of an annulus concentrically connected thereto an extending below the bottom portion thereof.
   said annulus portion defining the periphery of a cavity;
   (b) a discharge valve extending below the discharge opening of said heating chamber, which may be arranged and adapted to be positioned within said cavity;
   (c) a brewing chamber having an annular section connected to the heating chamber body and concentric therewith and extending below the discharge valve,
   said brewing chamber being suitably sized to hold a charge of beverage producing material, such as ground coffee;
   (d) an electrical heating means, which may be arranged and adapted to be positioned within said cavity;
   (e) a means for connecting the electrical heating means to an electrical power source; and
   (f) a means connected to the heating chamber body for securing a removable cup in an upright position concentric with said heating chamber body and extending said cup below and in sealing engagement with the brewing chamber,
   whereby a tandem arrangement with the heating chamber positioned on top, the removable cup positioned on the bottom, and the brewing chamber positioned in between permits a volume of fluid in the heating chamber to be discharged by the force of gravity first into the brewing chamber and then into the uprightly placed removable cup.

34. An apparatus for heating fluids, such as water, said apparatus comprising:
   (a) a heating chamber suitably sized to accept a volume of fluid with a closable fluid opening positioned in the top portion of the chamber suitably sized and adapted for incoming fluids, and a closable fluid opening positioned in the bottom portion of the chamber suitably sized and adapted for discharging said fluids;
(b) an electrical heating means;
(c) a means for connecting the electrical heating means to an electrical power source;
(d) closure means for each of the fluid chamber openings,
said closure means each being movable from an open position or a closed position, and said closure means for incoming fluid chamber opening also being independently movable from an open position to a closed position; and
(e) a means for interconnecting the closure means for the fluid discharge opening and the closure means for the incoming fluid chamber opening for transmitting the position of the closure means for the fluid discharge opening to a locking means for the closure means for the incoming fluid chamber opening,
whereby said closure means for the incoming fluid chamber opening may be moved from an open position to a closed position and may not be moved from a closed position to an open position when the discharge valve is in a closed position.

35. The apparatus for heating fluids of claim 34, wherein said apparatus further comprises:
(a) an electrical shut-off means thermally responsive to the heating chamber fluid temperature and operatively connected to said electrical heating means,
said shut-off means being arranged and adapted to regulate the flow of electrical energy to the electrical heating means when the chamber is at an excessive temperature;
(b) the closure means for the discharge fluid opening is a plug valve comprising a plug cooperating with a valve stem and handle;
(c) the means for interconnecting the discharge valve and the closure means for the fluid vent opening comprises an elongated piston, a means for biasing said piston axially toward the discharge valve at one end and away from engagement with the fluid vent opening on the other, and at least one set of piston guides,
said piston guides being attached to the exterior surface of the heating chamber and cooperatively engaged with said means for biasing;
(d) the closure means for the fluid vent opening comprises a sealing means cooperatingly attached to the end of the piston arranged and adapted to be placed in sealingly engaged relationship with the end of the fluid vent opening external to the heating chamber;
(e) the heating chamber has an elongated generally cylindrical body and further comprises a portion of an annulus concentrically connected to the heating chamber extending below the bottom portion thereof,
said heating chamber further comprising a generally cylindrical discharge valve body extending below the discharge opening of said heating chamber and transverse to said heating chamber,
said annulus portion defining the periphery of a cavity wherein the electrical heating means and the electrical shut-off means may be disposed adjacent to the discharge valve body,
said plug valve body having an outermost end that extends outwardly beyond the radius of the heating chamber and having an opening arranged and adapted to form a passageway for said piston in that portion of the plug valve body extending outwardly beyond the radial boundary of the heating chamber and having additional openings in said body, extending below and in communication with the fluid discharge opening, arranged and adapted to form a passageway for the chamber fluid discharge, and
said valve body defining a valve cavity therein, the innermost longitudinal boundary of said cavity being defined by two parallel semi-circular sectors forming a further half portion of a cylinder at the innermost end of said valve cavity;
(f) said plug valve having a generally cylindrical shape sized to snugly fit into said valve cavity and having a tubular passageway extending below and in communication with the fluid discharge opening when said plug is matingly engaged in an open position in the valve body,
said plug further comprising a quarter portion of a cylinder at the end opposite its exposed handle, arranged and adapted to cooperatingly engage the half portion of the cylinder at innermost end of said valve cavity, to limit the rotation of said plug to a quarter turn; and
(g) said plug further comprises a variable depth cam groove peripherally exposed transverse to the longitudinal axis of said plug, arranged and adapted for cooperating engagement with said piston,
whereby said sealing means end of the piston being biasedly arranged and adapted to be disengaged from the fluid vent opening when said discharge valve is in an open position and said piston in cooperating engagement with the cam groove of said valve adaptedly positioning the sealing means attached to the piston in a sealing engagement with the fluid vent opening when the discharge valve is rotated to a closed position, interconnecting the discharge valve and the closure means for fluid vent opening to cooperatively open and close simultaneously.

* * * * *